Figure 1:
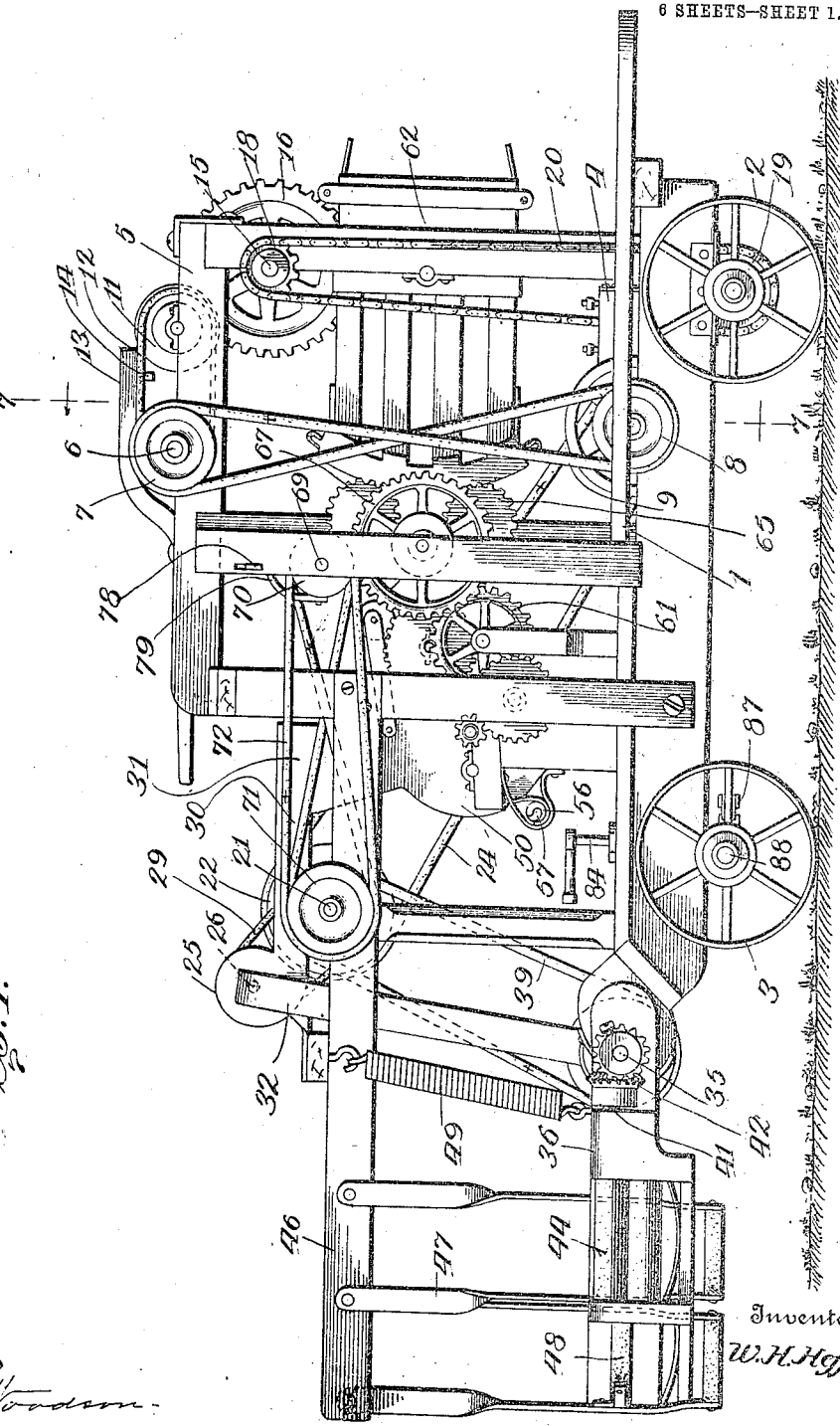

W. H. HEFFLEY.
COTTON HARVESTER.
APPLICATION FILED MAY 12, 1911.

1,095,572.

Patented May 5, 1914.
6 SHEETS—SHEET 1.

Witnesses

Inventor
W. H. Heffley
By
Attorneys

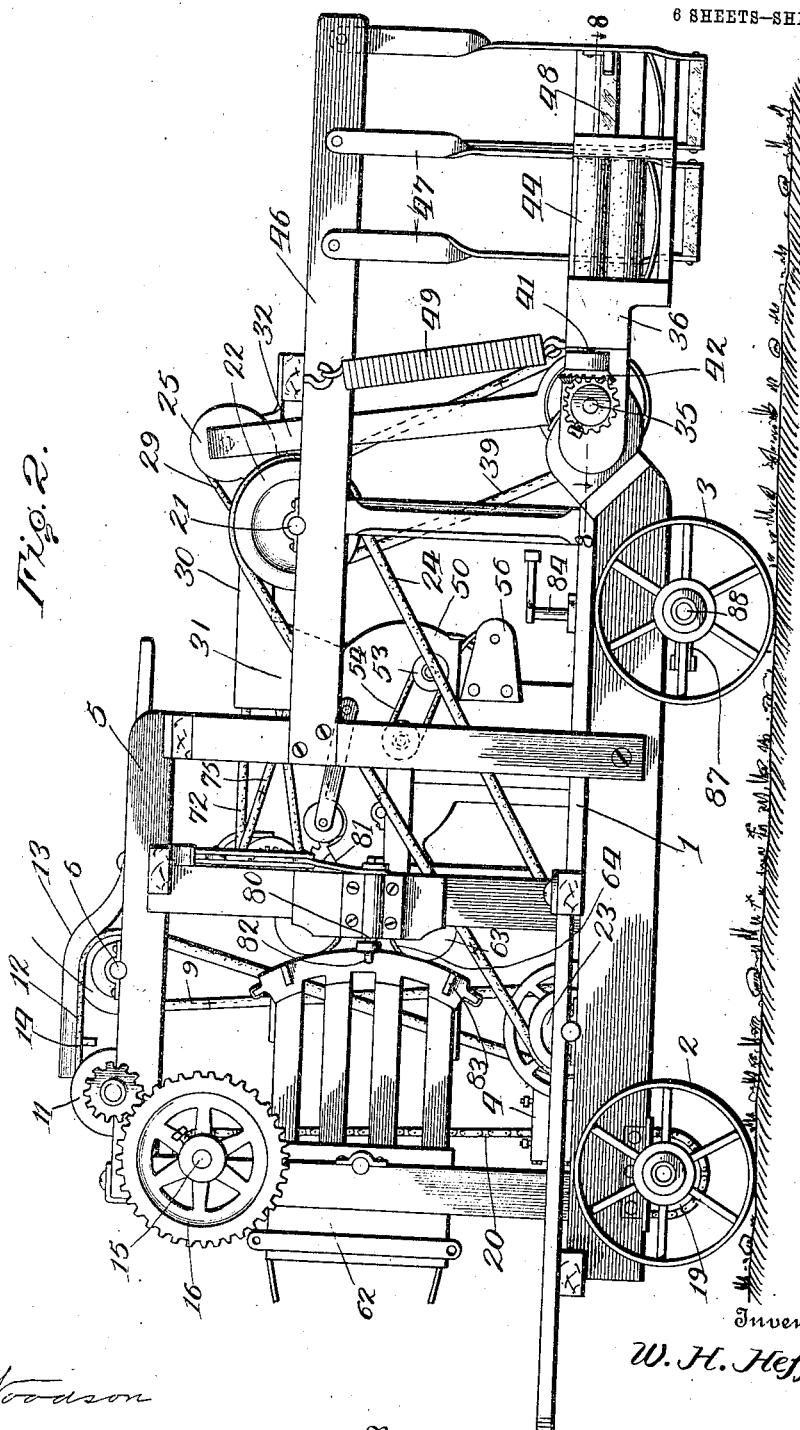

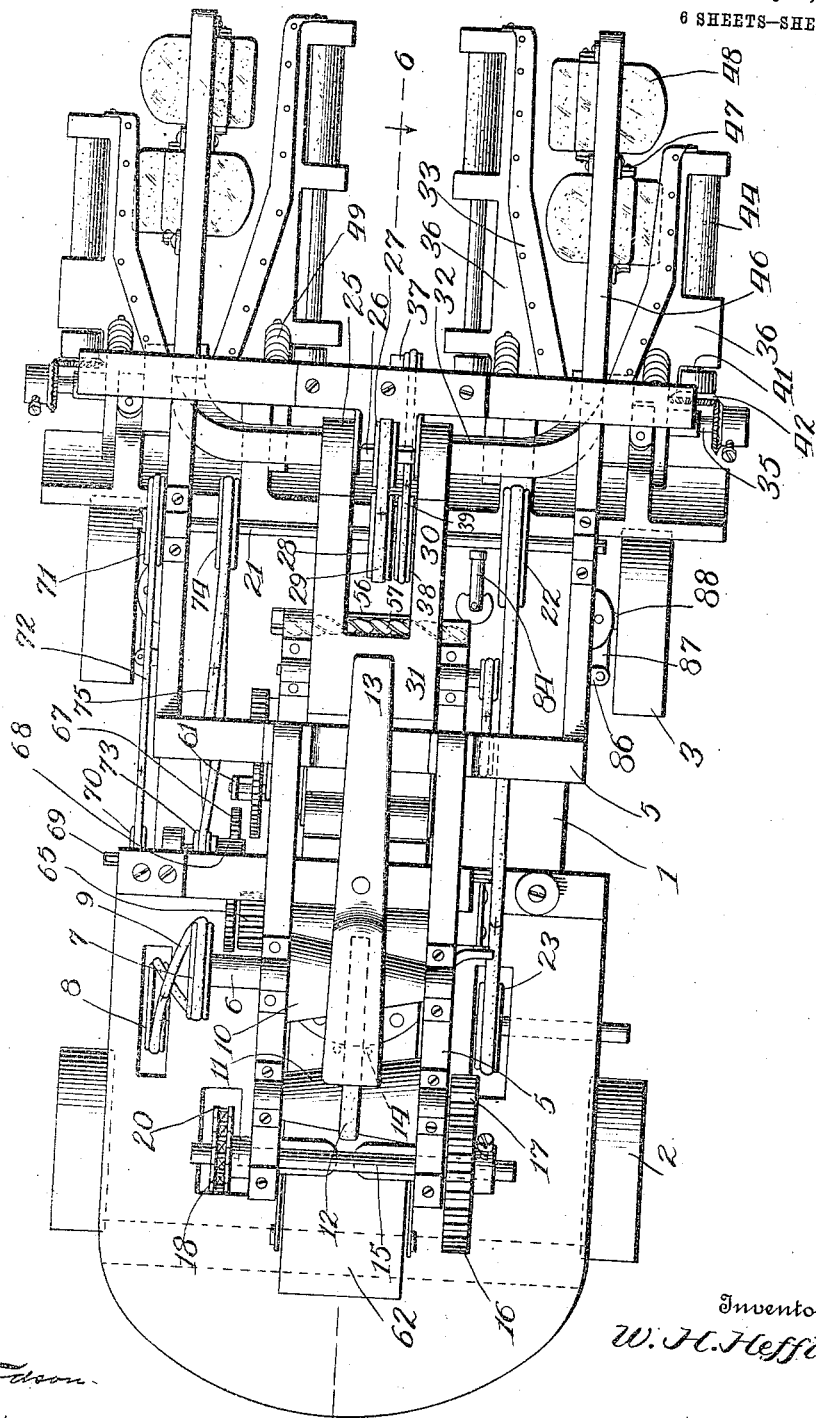

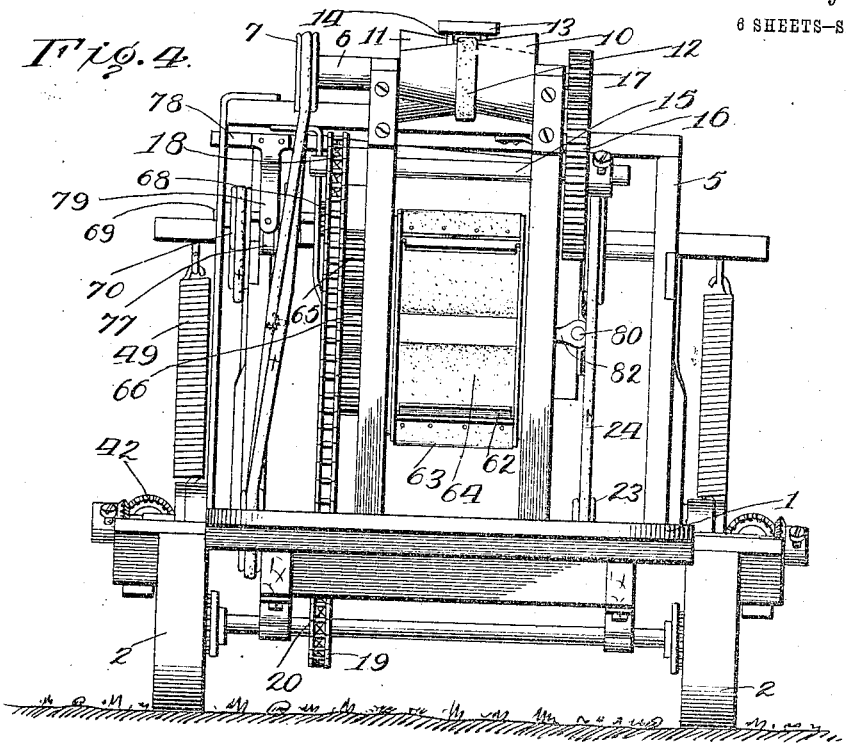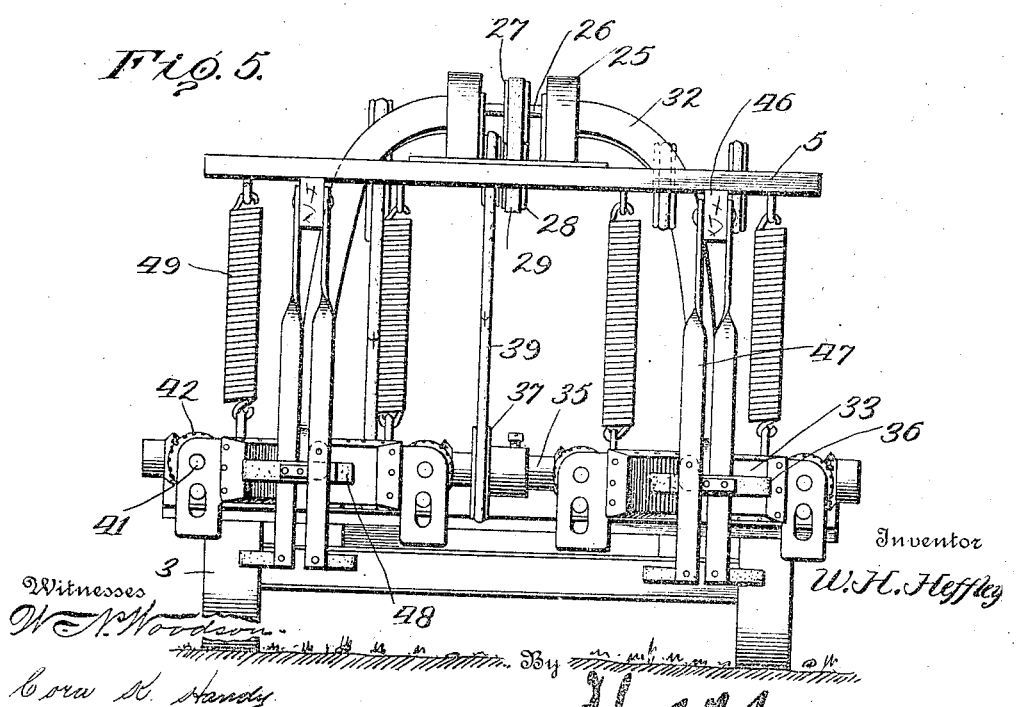

W. H. HEFFLEY.
COTTON HARVESTER.
APPLICATION FILED MAY 12, 1911.
1,095,572.
Patented May 5, 1914.
6 SHEETS—SHEET 5.
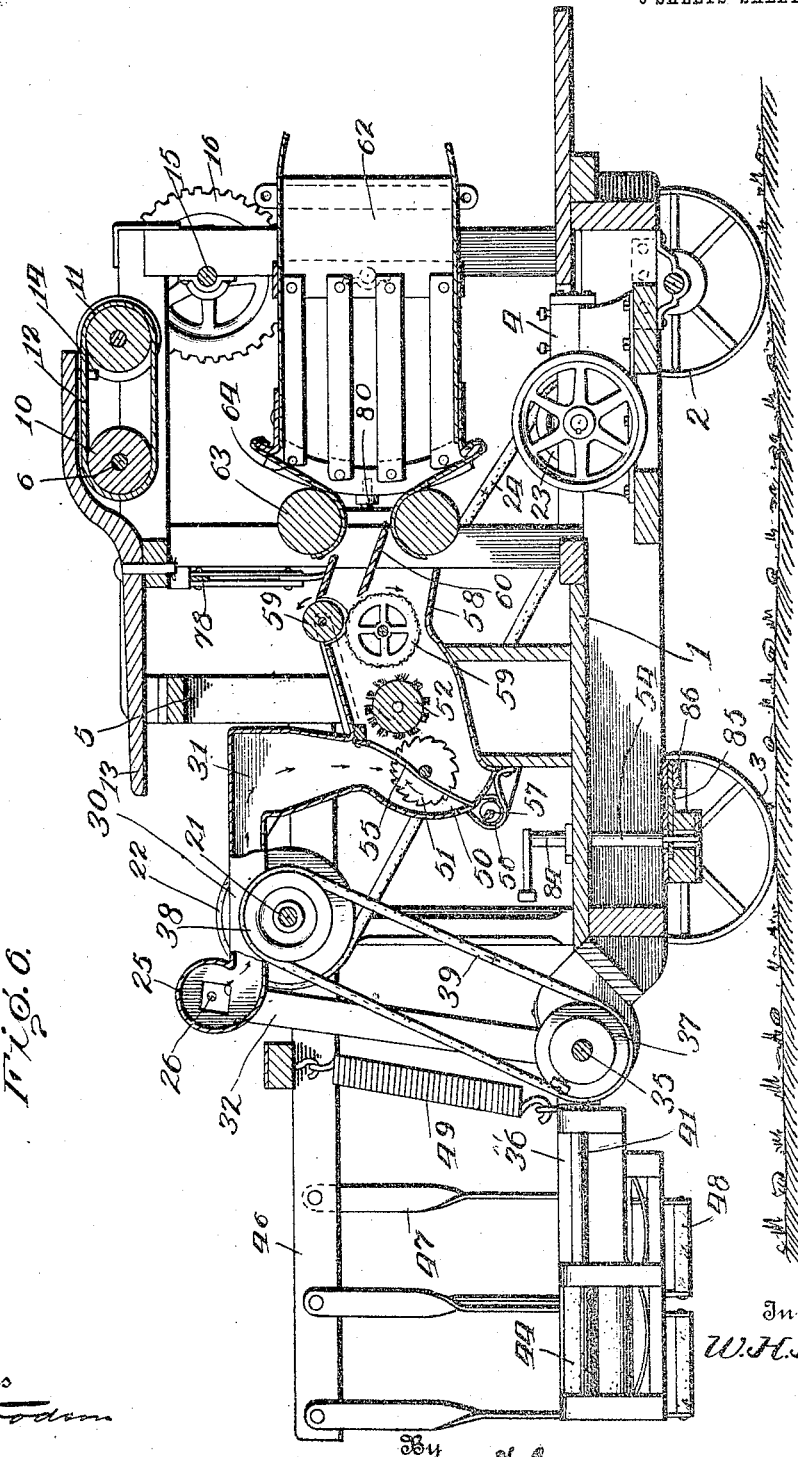
Witnesses
W. N. Woodson
Cora N. Hardy
Inventor
W. H. Heffley
By
Attorneys

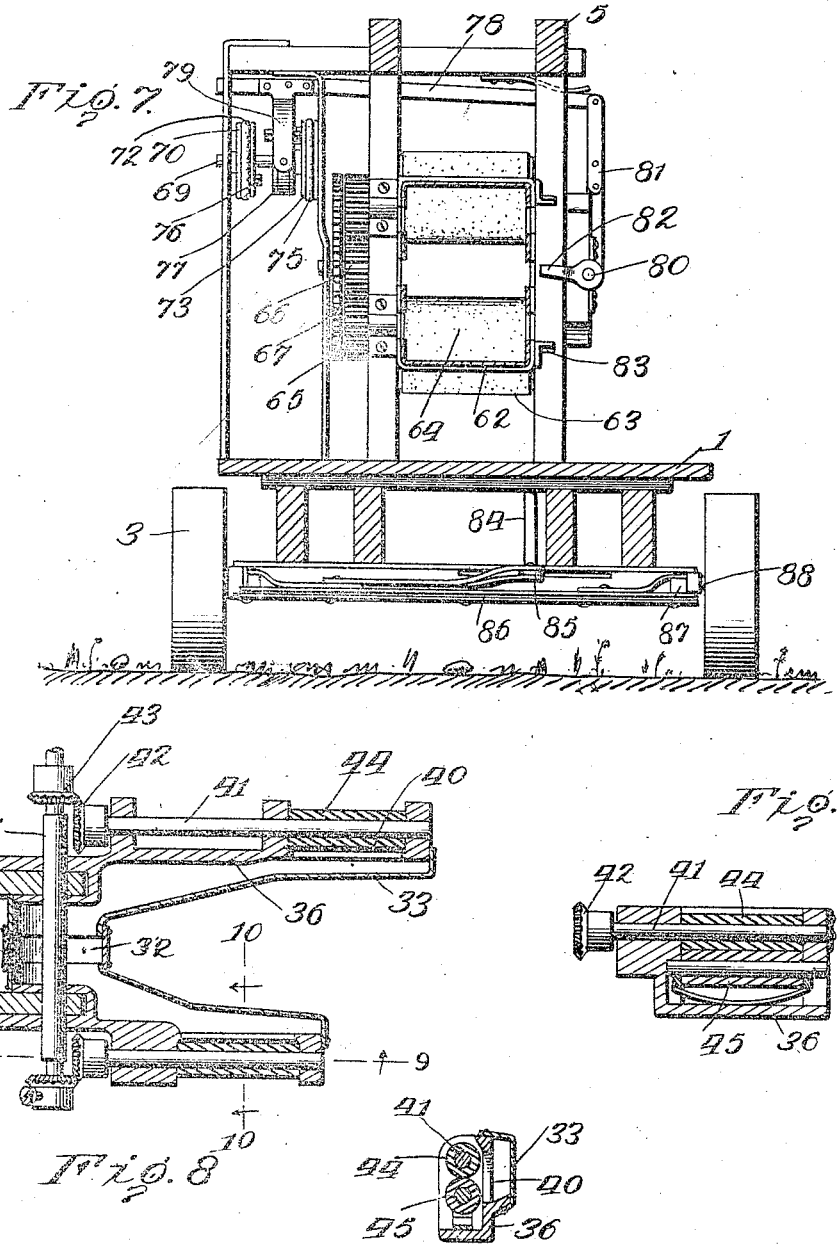

UNITED STATES PATENT OFFICE.

WILLIAM H. HEFFLEY, OF CHICKASHA, OKLAHOMA, ASSIGNOR OF ONE-HALF TO SAMUEL N. JOHNSON, OF GRACEMONT, OKLAHOMA.

COTTON-HARVESTER.

1,095,572.  Specification of Letters Patent.  Patented May 5, 1914.

Application filed May 12, 1911. Serial No. 636.787.

*To all whom it may concern:*

Be it known that I, WILLIAM H. HEFFLEY, a citizen of the United States, residing at Chickasha, in the county of Grady and State of Oklahoma, have invented certain new and useful Improvements in Cotton-Harvesters, of which the following is a specification.

This invention relates to cotton harvesters and has for its object to provide a self propelled machine adapted to be guided over a field and provided with carriages adapted to hold operators who present the cotton bolls to picking devices whereby the cotton is quickly removed from the bolls. The machine is designed to operate simultaneously upon four rows of plants and the cotton as it is removed from the bolls is carried by a suction draft means into a feeder from which it is passed into a gin where the fiber is removed from the seed. From the gin the seed enters a conveyer which carries the same to one side of the frame of the gin stand where it may be bagged or deposited in suitable receptacles. From the gin the cotton fiber passes into a condenser which forms the same into a continuous bat. Immediately back of the condenser, is located a vertically swinging press into which the bat is passed whereby the bat is positioned in the press in vertical folds, and when a sufficient quantity has been accumulated it may be secured by bale bands and ties so that when the staple is delivered from the machine it is in a bale in which it may be easily and conveniently handled for transportation and other purposes.

In the accompanying drawings: Figure 1 is a vertical elevation of the cotton harvester viewing the same at one side; Fig. 2 is a similar view of the harvester viewing the same at the opposite side; Fig. 3 is a top plan view of the harvester; Fig. 4 is a rear end elevation of the harvester; Fig. 5 is a front end elevation of the same; Fig. 6 is a vertical longitudinal sectional view of the same cut on the line 6—6 of Fig. 3; Fig. 7 is a transverse sectional view of the frame cut on the line 7—7 of Fig. 1; Fig. 8 is a horizontal sectional view of cotton pulling devices used upon the harvester; Fig. 9 is a longitudinal sectional view of one of the said devices cut on the line 9—9 of Fig. 8; Fig. 10 is a transverse sectional view of one of the said picking devices cut on the line 10—10 of Fig. 8.

Corresponding and like parts are referred to in the following description and indicated in all the views of the drawing by the same reference characters.

The cotton harvester includes a platform 1 which is mounted at its rear end upon traction wheels 2 and at its forward end portion upon dirigible wheels 3. An engine 4 is mounted upon the frame 1 and constitutes the source of power that operates all of the cotton handling parts of the machine. This engine is preferably of the hydro-carbon type, but any other source of power may be employed.

A super-structure 5 is mounted upon the platform 1 and a shaft 6 is journaled thereon. A pulley 7 is fixed to the shaft 6 and a pulley 8 is fixed to the shaft of the engine 4. A shiftable belt 9 is trained around the pulleys 7 and 8, and is adapted to transmit rotary motion from the engine shaft to the shaft 6. A cone 10 is fixed to the intermediate portion of the shaft 6 and a cone 11 is journaled upon the super-structure 5 with its axis parallel to the axis of the cone 10. These cones have their smaller ends disposed in opposite directions and a shiftable belt 12 is trained around the peripheries of the said cones. A lever 13 is fulcrumed upon the super-structure 5 and is provided with downwardly disposed fingers 14 which are located at the opposite edges of the upper run of the belt 12, and between the cones 10 and 11. Therefore it will be seen that by swinging the lever 13 the belt 12 may be shifted along the cones 10 and 11, so that the rate of speed at which the cone 11 may rotate, is varied with relation to the rate of speed at which the cone 10 rotates. In other words, the cone 10 rotates at a constant rate of speed, while by the lever mechanism and the belt described, the rate of speed at which the cone 11 rotates, may be regulated. A shaft 15 is journaled for rotation upon the super-structure 5, and a gear wheel 16 is carried by the said shaft 15. The gear wheel 16 meshes with a gear wheel 17, fixed to the shaft of the cone 11. A sprocket wheel 18 is fixed to the shaft 16 and a sprocket wheel 19 is fixed to the axle of the traction wheels 2. A sprocket chain 20 is trained around the sprocket wheels 18 and 19, and is adapted to transmit rotary motion from the shaft 15 to the axle of the wheels 2. Therefore it will be seen that means is provided for propelling the machine at a desired rate of speed.

A master shaft 21 is journaled upon the super-structure 5, and is provided with a belt pulley 22. A belt pulley 23 is fixed to the shaft of the engine 4 and a belt 24 is trained around the pulleys 22 and 23, and is adapted to transmit rotary movement from the shaft of the engine 4 to the master shaft 21.

Suction fans 25 are mounted upon the super-structure 5 and are arranged to be operated by a shaft 26 common to both. A pulley 27 is mounted upon the shaft 26 and a pulley 28 is mounted upon the master shaft 21. A belt 29 is trained around the pulleys 27 and 28, and is adapted to transmit rotary movement from the shaft 21 to the fan shaft 26. The casings of the fans 25 are provided with discharge pipes 30 which communicate with the upper end of a gin feeder 31. The fan casings 25 are also provided with intake pipes 32, each of which is provided with two pivoted branches 33 constrained to swing in vertical planes only. A shaft 35 is journaled for rotation at the forward end portion of the platform 1, and pivotally supports arms 36 to each of which is attached one of the pivoted pipe branches 33. A pulley 37 is fixed to the shaft 35 and a pulley 38 is fixed to the shaft 21. A belt 39 is trained around the pulleys 37 and 38, and is adapted to transmit rotary movement to the shaft 35 from the shaft 21. As illustrated in Fig. 8 of the drawing, the pipe branches 33 are provided in their sides with openings 40 which register with openings provided in the forward portions of the arms 36. Shafts 41 are journaled in bearings provided upon the arms 36 and at their rear ends are provided with beveled gear wheels 42 which mesh with beveled gear wheels 43 mounted upon the shaft 35. The shafts 41 are provided at their forward portions with pulling rolls 44 which are located at the upper edge portions of the inlet openings 40 into the pipes 32. Spring-supported rolls 45 are freely journaled at the forward ends of the arms 36 and have the upper portions of their peripheries resiliently held against the lower portions of the peripheries of the rolls 44. Each pipe 33 and arm 36 may swing vertically independent of every other said pipe and arm.

It will be readily understood upon reference to Figs. 8 and 10, that the outer sides of the branch tubes 33 are formed by the respective arms 36, and it will also be noted that while the said arms and branch tubes are mounted upon the shaft 35 as their pivotal support, the inner or pivoted ends of the arms are constructed with offsets which engage projections on the main frame so that horizontal movement of the arms and the branch tubes will be prevented. It will also be noted that the inner ends of the branch tubes are laterally deflected to fit closely within circular enlargements at the ends of the main suction tubes 32 which are disposed concentric with the shaft 35 so that while vertical movement of the branch tubes about their connections with the main tube will be permitted, lateral movement of the branch tubes, relative to the main tube, and the consequent disconnecting of the same cannot occur. The mouths or inlet openings of the suction tubes may thus be readily adjusted vertically to engage the cotton bolls, but cannot move laterally so as to pass from between the rows of plants or strike the plants so as to retard or restrain the efforts of the operator to bring the cotton bolls into position to be engaged by the pulling rolls.

The super-structure 5 is provided with forwardly disposed beams 46 from which depend hangers 47. Seats 48 are carried at the lower ends of the hangers 47 and are arranged one adjacent each pair of the said pulling rolls 44 and 45. As illustrated in Fig. 3 of the drawing it will be seen that these seats are arranged two at each side and in front of the platform 1, and the seats of each pair are disposed in opposite directions each pair of seats being located between an inner and an outer arm 36. The seats of each pair are arranged one behind the other in the direction in which the machine travels, and consequently occupy minimum space in a direction transversely of the machine. The arms 36 are of the same general structure, the only exception being that the inner arms are longer than the outer arms so that the occupants of the forward seats at each side of the machine may coöperate with the pulling rolls carried by the longer arms, and the occupants of the rearmost seats may coöperate with the rolls carried by the shorter arms. Springs 49 are attached at their upper ends to the super-structure 5 and at their lower ends to the rear end portions of the arms 36, but in advance of the pivotal supporting points thereof, and said springs serve as means for normally holding the said arms in approximately horizontal positions.

A gin 50 is mounted upon the platform 1 and is arranged to receive cotton from the feeder 31. The said gin may be of any approved pattern and is provided with the usual gin saws 51 and doffing brush 52. The shafts of the saws and doffing brush are provided with pulleys 53, best seen in Fig. 2, around which a belt 54 is trained to cause the said saws and doffing brush to coöperate in conjunction with each other in performing the ginning operation and also in enabling the brush to remove the cotton from the saws. The gin 50 is provided with the usual set of ribs 55 which coöperate with the saws 51. The gin 50 is provided below its seed outlet with a seed trough 56 into which a worm gear 57 may be belted up with any convenient rotative part of the gin. Any suitable means (not shown) may be provided for operating the shaft of the engine 4.

The condenser casing has a receiving opening in communication with the discharge outlet of the gin 50, and a foraminous cylinder 59 is journaled for rotation in the condenser casing 58. An inclined board 60 is arranged to coöperate with the cylinder 59 for removing the bat of cotton therefrom and for passing the same between the presenting rolls of a press box hereinafter to be described. As indicated in Figs. 1 and 3 of the drawing, a train of gear wheels 61 operatively connects the condensing cylinder 59 and the adjacent rolls with the shaft of the doffing brush 52.

A press box 62 is pivotally mounted between vertical standards forming the rear portion of the super-structure 5. This box may be of any approved or conventional form. Bat presenting rolls 63 are journaled upon the super-structure 5 between the receiving end of the press box 62 and the delivery end of the condenser casing 58. These rolls 63 have attached to the inner portions of their peripheries the inner or forward ends of flexible strips 64. The outer or rear ends of these strips are attached one to the upper forward portion of the press box 62, and the other to the lower forward portion of the said box. The shafts of the rolls 63 are provided with gear wheels 65 best seen in Fig. 4 of the drawing and the gear wheel 66 is journaled upon the side of the super-structure 5, and meshes with the upper and lower gear wheels 65.

Means is provided for causing the rolls 63 to describe partial rotations alternately in opposite directions, and this means will now be explained. A gear wheel 67 is fixed to the shaft of the wheel 66 and meshes with the gear wheel 68 mounted by a shaft 69 which in turn is journaled in the upper portion of the super-structure 5. A belt pulley 70 is loosely journaled upon the shaft 69, and a belt pulley 71 is fixed to the shaft 21. A straight belt 72 is passed around the pulleys 70 and 71, and is adapted to transmit rotary movement from the shaft 21 to the said pulley 70. A belt pulley 73 is loosely journaled upon the shaft 69 and a belt pulley 74 is fixed to the shaft 21. A crossed belt 75 is trained around the pulleys 73 and 74, and is adapted to transmit rotary movement from the shaft 21 to the pulley 73 whereby the pulley 73 is rotated in the reverse direction from that in which the pulley 70 rotates. The pulleys 70 and 73 carry upon their inner faces clutch members 76, as best seen in Fig. 7 of the drawing and a clutch member 77 is slidably mounted upon the intermediate portion of the shaft 69, but is constrained to rotate in unison with the same. A bar 78 is slidably mounted in the upper portion of the super-structure 5, and is provided with a yoke 79 which engages the opposite side portions of the clutch member 77 in the usual manner. A shaft 80 is journaled for rotation at the opposite side of the super-structure 5 from the pulleys 70 and 73 and is provided with an arm 81 which is pivotally connected at its upper end with a projecting end portion of the bar 78. A tappet 82 is fixed to the shaft 80, and is located between lugs 83 carried at the adjacent side of the press box 62, said tappet 82 projecting into the path of movement of the said lugs.

Presuming now that the clutch member 77 is in engagement with the clutch member 76 upon the wheel 70, when this is so, the tappet 82 is downwardly disposed with relation to the axis of the shaft 80, but the operating gearing of the press box is so arranged that the lower forward end of the said press box 62 is moving in a forward direction. This is due to the fact that the shaft 69 is held by the clutch member 77 in fixed relation to the pulley 70, and as the said pulley is rotated, as has been hereinbefore explained, the shaft 69 rotates in unison with the same in one direction, and this rotary movement is transmitted through the gear wheel 68 to the gear wheel 67 and through the gear wheel 66. The gear wheels 65 are rotated in opposite directions which at this time will wind the flexible strip 64 upon the lowermost roll 63 and unwind the strip 64 from the uppermost roll 63. This winding and unwinding of the strips 64 swings the press box 62 upon its pivot. When the lowermost lug 83 comes in contact with the end of the tappet 82, the said tappet is swung so that the shaft is partially rotated, and the bar 78 is moved longitudinally whereby the yoke 79 carries the clutch member 77 away from the wheel 70 and engages the same with the wheel 73. Inasmuch as the wheel 73 is rotated in the opposite direction from that in which the wheel 70 rotates, as has been hereinbefore explained, the shaft 69 is reversed in its rotation and through the intervening parts reverse movement occurs so that the uppermost lug 83 upon the press box 62 moves down and engages the end of the tappet 82 which is now upwardly disposed and swings the same and partially rotates the shaft 80. Therefore it will be seen that means is provided for automatically causing the forward end of the press box 62 to swing vertically.

It has been hereinbefore stated that the machine is adapted to operate simultaneously upon four rows of standing cotton. An operator occupies each of the seats 48 and as the machine passes along the rows they direct the branches of the cotton plants carrying the bolls against the sides of the pulling rolls 44 and 45 which are maintained in a state of rotation by the shafts 41, intermeshing gear wheels 42 and 43, and the shaft 35. As the fiber is engaged by the rolls 44 and 45, it is pulled between the said rolls and the fiber is thus removed from the boll. From the rolls 44 and 45, this fiber is passed into the receiving opening of the branch pipes 33. Inasmuch as the suction fans 25 create suction draft through the said branch pipes 33 and the pipes 32, the cotton is carried to the fans 25 and thence is forced through the pipes 30 into the feeder 31. From the feeder 31 the cotton is passed down into the gin 50 in which the fiber is removed from the seed and the seed is deposited in the trough 56. The fiber is carried around by the saws 51 and is operated upon by the doffing brush 52 which passes the same to the periphery of the cylinder 59 in the condenser casing 58. From the cylinder 59 the cotton is removed on an inclined plane, in the form of a bat and passed between the introducing rolls 63 of the press box 62. Inasmuch as the said press box is reciprocating vertically at its forward end as has been hereinbefore explained, the said bat is folded vertically in the press box and as it is continued to be fed in, the folds are pushed toward the delivery end of the press box 62, and when a sufficient quantity has been accumulated bale bands and ties may be applied to the same and thus the bale is completed and is eventually ejected from the press box 62 during the formation of another bale therein.

It has been stated that the forward wheels are dirigible, and any suitable means may be provided for steering the said wheels. That shown in the accompanying drawings consists of a tiller 84 having its handle end located above the platform 1, and having fixed to its lower end an arm 85. This arm 85 is pivotally connected with cross bars 86 at points intermediate the ends thereof, and the said cross bars in turn are pivotally connected at their outer ends with arms 87 which are fixed to the inner end portions of pivoted spindles 88 upon which the said wheels 3 are journaled. Therefore it will be seen that by swinging the tiller 84 the arm 85 carried thereby is swung so that the bars 86 are moved longitudinally and the arms 87 are swung simultaneously in the same direction which swings the spindles 88 and the wheels 3 are steered.

Having thus described the invention, what I claim as new, and desire to secure by Letters Patent is:

1. In a cotton harvester, the combination with a main frame, of a suction tube mounted thereon, branch tubes having their rear ends pivotally fitted in and communicating laterally with the opposite sides of the suction tube about a common pivotal center and extending forwardly therefrom, cotton-picking devices mounted on the outer sides of the branch tubes, means to prevent lateral movement of the branch tubes, and means to create a suction through the tubes.

2. In a cotton harvester, the combination with a main frame, of a suction tube mounted thereon, branch tubes pivotally connected with and extending laterally from the opposite sides of the suction tube, and supporting members for the branch tubes pivotally connected with the main frame and engaging the said main frame to be held against lateral movement, the pivots of the said supporting members and the branch tubes being in axial alinement, and cotton pulling devices at the outer ends of the supporting members and the branch tubes.

3. In a cotton harvester, the combination with a main frame, of a suction tube supported thereon, branch tubes disposed at opposite sides of the lower end of the suction tube and extending forwardly therefrom and having lateral offsets at their inner ends pivotally engaging the lower end of the suction tube, supporting arms for the said branch tubes having stops at their inner ends engaging the main frame and pivotally attached to the main frame in axial alinement with the pivotal connection between the suction tube and the branch tubes, cotton picking devices at the outer ends of the branch tubes and said supporting arms, and mechanism on the supporting arms for operating said picking devices.

4. In a cotton harvester, the combination of a main frame, a suction tube mounted thereon, a shaft journaled in the main frame and extending transversely through the lower end of the suction tube, supporting arms pivotally mounted on said shaft and projecting forwardly from the main frame and having their inner ends forming stops fitting against the main frame, branch tubes secured to the inner sides of said supporting arms and having their inner ends offset laterally and pivotally engaged in the lower end of the suction tube, cotton picking rolls at the outer ends of the said supporting arms, and gearing carried by the supporting arms and connecting the said shaft with the picking rolls.

In testimony whereof, I affix my signature in presence of two witnesses.

WILLIAM H. HEFFLEY. [L. S.]

Witnesses:
W. C. MATTHEWS,
H. HESTAND.